(12) United States Patent
Sanso et al.

(10) Patent No.: US 9,419,959 B2
(45) Date of Patent: Aug. 16, 2016

(54) DYNAMICALLY MAPPING USERS TO GROUPS

(71) Applicant: Adobe Systems Incorporated, San Jose, CA (US)

(72) Inventors: Antonio Sanso, Allschwil (CH); Stefan Guggisberg, Muenchenstein (CH); David Nuescheler, Landser (FR)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/619,896

(22) Filed: Feb. 11, 2015

(65) Prior Publication Data

US 2015/0156190 A1 Jun. 4, 2015

Related U.S. Application Data

(62) Division of application No. 13/949,701, filed on Jul. 24, 2013.

(51) Int. Cl.
*H04L 29/06* (2006.01)

(52) U.S. Cl.
CPC .............. *H04L 63/08* (2013.01); *H04L 63/104* (2013.01); *H04L 63/126* (2013.01)

(58) Field of Classification Search
CPC ... H04L 63/08; H04L 63/083; H04L 63/0876; H04L 63/0861; G06F 21/31
See application file for complete search history.

(56) References Cited

U.S. PATENT DOCUMENTS

| 6,963,417 | B1 | 11/2005 | Saito |
| 7,954,148 | B2 * | 5/2011 | Suominen ............... G06F 21/64 713/183 |
| 8,127,345 | B2 * | 2/2012 | Gregg ................... G06F 21/335 726/4 |
| 8,200,694 | B1 | 6/2012 | Diligenti et al. |
| 8,732,853 | B1 | 5/2014 | Byrne et al. |
| 8,788,490 | B1 * | 7/2014 | Chatra .......................... 707/726 |
| 8,881,240 | B1 * | 11/2014 | Malik ................... G06F 21/604 726/4 |
| 2001/0034849 | A1 | 10/2001 | Powers |
| 2006/0053483 | A1 * | 3/2006 | Beattie ................ G06F 21/6218 726/5 |
| 2007/0043816 | A1 | 2/2007 | Ishibashi |
| 2010/0145932 | A1 * | 6/2010 | Rook ................... G06Q 10/107 707/722 |
| 2011/0099616 | A1 | 4/2011 | Mazur et al. |

(Continued)

OTHER PUBLICATIONS

Notice of Allowance for U.S. Appl. No. 13/949,701 mailed Aug. 14, 2015 ( 20 pages).

*Primary Examiner* — Yonas Bayou
(74) *Attorney, Agent, or Firm* — Kilpatrick Townsend & Stockton LLP

(57) ABSTRACT

Methods and systems for authenticating users and assigning authenticated users to groups are provided. A method receives a user credential and email address. The method forwards an authentication request including the email address and credential to a remote authentication provider. Based in part on the presence of a full user name in a received response, the method determines that the user is authenticated. Another method extracts a domain name from a received email address of an authenticated user. In response to determining that the domain name is associated with a group, the method assigns the user to the group. A system includes memory with instructions for assigning an authenticated user to a group. The system receives the user's email address and extracts a domain name from the email address. In response to determining that the domain name is associated with a group, the system assigns the user to the group.

20 Claims, 5 Drawing Sheets

(56) References Cited

U.S. PATENT DOCUMENTS

| | | | |
|---|---|---|---|
| 2011/0283341 A1* | 11/2011 | Palekar | G06F 21/604 726/4 |
| 2012/0159584 A1* | 6/2012 | Pizot | H04L 63/0876 726/5 |
| 2012/0311669 A1 | 12/2012 | Akase | |
| 2013/0055362 A1* | 2/2013 | Rathbun | H04L 63/18 726/5 |
| 2013/0061335 A1 | 3/2013 | Schwabe | |
| 2014/0173753 A1* | 6/2014 | Sanso | H04L 63/104 726/28 |
| 2014/0215574 A1* | 7/2014 | Erb | H04L 63/10 726/4 |
| 2014/0259127 A1* | 9/2014 | Shaw | H04L 63/0884 726/5 |
| 2014/0297426 A1* | 10/2014 | Young | G06Q 30/0271 705/14.67 |
| 2015/0033297 A1 | 1/2015 | Sanso et al. | |

\* cited by examiner

DYNAMICALLY MAPPING USERS TO GROUPS

CROSS-REFERENCES TO RELATED APPLICATIONS

This application is a divisional application of U.S. patent application Ser. No. 13/949,701 filed on Jul. 24, 2013, the contents of which are incorporated herein in their entirety.

TECHNICAL FIELD

This disclosure relates generally to computer-implemented methods and systems for user authentication and group management and more particularly relates to authenticating users based on email addresses and credentials, and dynamically mapping users to groups in a hierarchical repository.

BACKGROUND

Some prior user authentication solutions require account credentials that are combinations of a user-furnished password or personal identification number (PIN) and a generated security token. Some existing authentication solutions rely on smart cards or hardware tokens stored on a dedicated storage device. Such solutions typically require a dedicated authentication server, which must be synchronized with the hardware tokens in order to generate time-synchronized one-time passwords or synchronous dynamic password tokens.

Traditional approaches to authenticating users employ Single sign-on (SSO) techniques and/or directory services accessed using the Lightweight Directory Access Protocol (LDAP). SSO requires centralized, dedicated authentication servers that all applications and computing devices in an environment must use for authentication. Because different resources and applications require different authentication protocols and mechanisms, SSO systems must internally translate and store credentials differing from credentials used for initial user authentication. Due to their complexity and requirements for dedicated servers and proprietary software, directory services and SSO systems are often expensive to implement and maintain.

Group membership is typically based on a system administrator explicitly adding users to groups. Traditional group management techniques rely on manual steps and processes for adding users to groups. Such techniques require significant resources from webmasters, and/or other information (IT) technology personnel such as system, database, and/or network administrators. Some prior group management solutions map users to groups statically through use of pre-determined configuration files. Such static mappings are done a priori and cannot dynamically map users to groups at runtime based on an email address or an organization determined when users log in. Existing group management solutions create new users when users log in for the first time and then manually add new users to groups. Some of these solutions initiate a work flow every time a new user logs in. The work flow requires manual steps of checking the user's information and explicitly adding the new user to a specific group after inspecting the information. Such prior solutions do not provide automated, implicit, runtime assignment of a user to a group based on the user's email address and/or information retrieved from a third party.

SUMMARY

In one embodiment, a method for assigning a user to a group includes receiving, at a computing device, an email address associated with an authenticated user. The method extracts a domain name from the email address. The embodiment involves determining whether the extracted domain name is associated with at least one group. In response to determining that the extracted domain name is associated with the at least one group, the method assigns the authenticated user to the at least one group.

In another embodiment, a method for authenticating a user includes receiving, at a computing device, a resource request including account credentials and an email address associated with a user requesting the resource. The method forwards an authentication request to an authentication provider. The forwarded authentication request includes the received email address and at least a portion of the account credentials. The embodiment involves receiving, at the computing device, a response to the authentication request, where the response includes at least a full user name associated with an authenticated user, or an indication that the user is not authenticated.

In yet another embodiment, a system has an input device, a display device, a processor, and a memory. The memory has instructions stored thereon that, if executed by the processor, cause the processor to perform operations for assigning an authenticated user to a group. The operations include receiving an email address associated with an authenticated user and extracting a domain name from the received email address. The system determines whether the extracted domain name is associated with one or more of a plurality of groups. In response to determining that the extracted domain name is associated with at least one of the plurality of groups, the system automatically assigns the authenticated user to the at least one of the plurality of groups.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
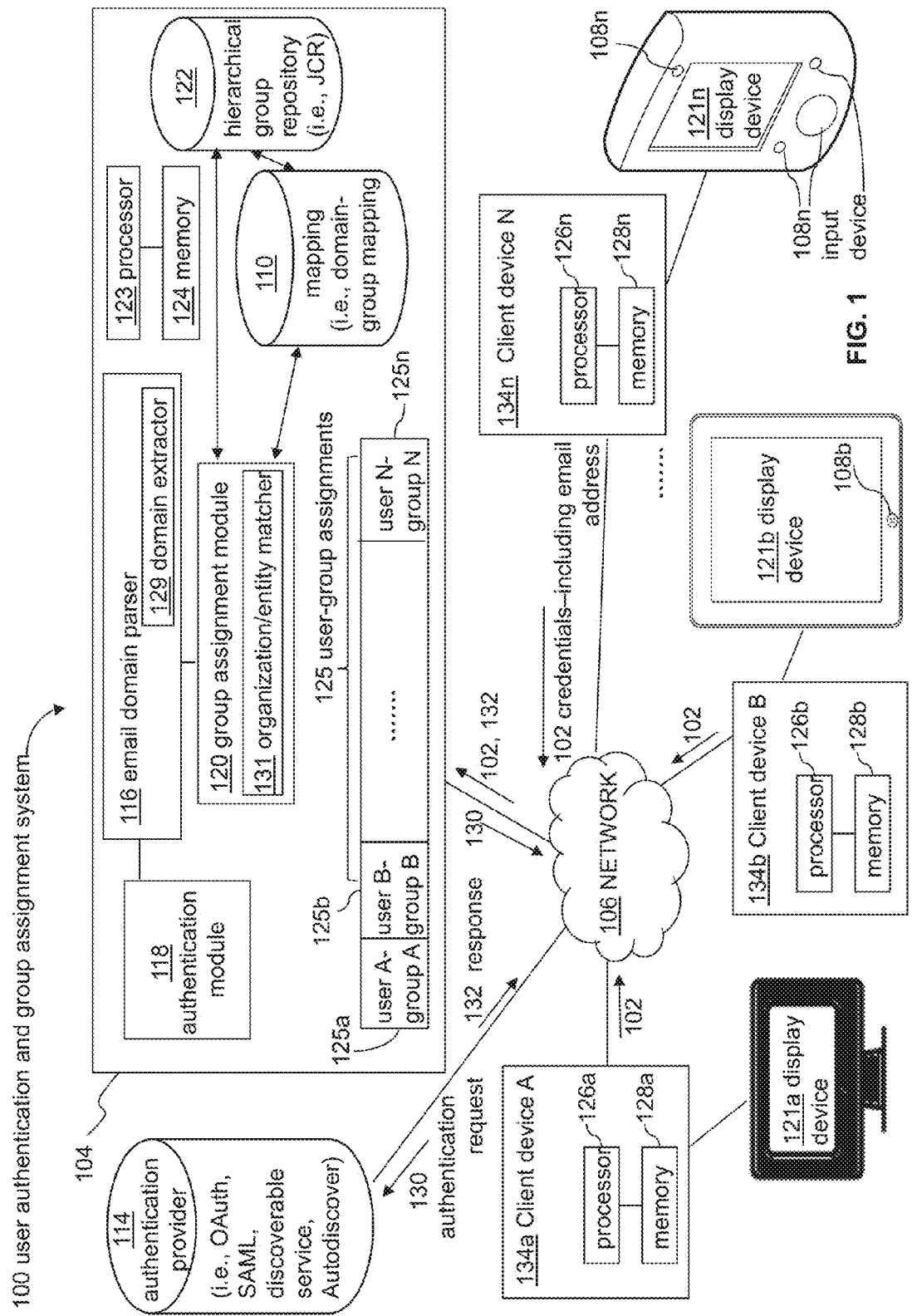
FIG. 1 is a block diagram depicting a system architecture and components for a user authentication and group assignment system, in accordance with embodiments.

Methods and systems are disclosed for authenticating users and assigning authenticated users to groups associated with an entity.

In the context of computing systems, user accounts and groups can be employed in order to control access to computing resources such as web site content, software applications, databases, and files. For example, when a request for a resource is initiated, for example, as an attempt to execute an application or access electronic content, user account credentials may be required. A user can be granted permissions to access computing resources based on the user's membership in a group. Users can be automatically assigned to groups based in part on a configuration file. For example, users authenticated using an open standard for authorization (OAuth) authenticator can be placed in an administrators group and other users authenticated using a Security Assertion Markup Language (SAML) authenticator can be placed in an authors group.

SSO, which can be provided using LDAP, can be used to for user authentication and for applying an entity's login code to the entity's computing resources. With SSO, one password for a user account can be shared amongst multiple services. For example, if the entity is a corporation, SSO can be used to apply a corporate login code to the corporation's intranet web pages so that the corporation's employees login once onto corporate computing devices, and then are automatically logged into and granted access to the corporation's intranet.

Embodiments provide methods and systems for authenticating users by submitting an authentication request including an email address and a credential to an authentication provider hosting a discoverable service in order to obtain a response with an authentication status, and in cases where the user is authenticated, a full user name. According to an embodiment, the email address and credential can be received, implicitly or explicitly, as part of a resource request. The resource request can be a request to access a web page, a digital asset, or any other electronic content item. The email address can be an email address furnished by or associated with a user requesting a resource and the credential can be a password for a user account associated with the user. Credentials can also include, for example, a unique user identifier (ID) such as a user principal name (UPN), a full user name, or a display name; and one or more of a digital signature, biometric data such as fingerprint minutiae, a security token, and a personal identification number (PIN). In certain embodiments, the discoverable service is an Autodiscover service and the authentication request is formatted as an Autodiscover request. Such an Autodiscover request can be sent to specific uniform resource locators (URLs) that include at least a portion of the domain part of the email address. The authentication status can be inferred based on successful (or failed) attempts to access the URLs and the presence of a full user name in an authentication response. The Autodiscover request can also be sent to an authentication provider hosting an Autodiscover service. Upon receipt of the Autodiscover request, the authentication provider attempts to access the specific URLs and generates an Autodiscover response with an authentication status based on the results of attempts to access the one or more URLs. Some of the URLs can include portions of the domain part of the email address included in the Autodiscover request. In embodiments, the Autodiscover response includes a full user name for an authenticated user. In certain embodiments, an Autodiscover response for an authenticated user can include other user information such as, for example, group membership(s), role(s), organization information, office location, phone number(s), department, and/or other information from a global address list (GAL) record corresponding to the authenticated user. The server sending the response can be a back end server, such as an enterprise email server. In non-limiting embodiments, the server is a Microsoft® Exchange server or a server configured to run an IBM Notes or Lotus Notes application from IBM.

Exemplary methods and systems disclosed herein automatically establish implicit user-group associations for authenticated users, thus dramatically increasing operational efficiency as compared to traditional, explicit user-group associations carried out by manual operations. Certain embodiments can make group assignments by retrieving a user's organization information from a third party having a profile for the user, and then matching the user's organization information to an existing group in a hierarchical group repository. Additional or alternative embodiments assign an authenticated user to a group based on matching a domain, subdomain, or regular expression (regex) extracted from the user's email address to a mapping of the domain, subdomain, or regex to a group in a predefined mapping table. Extracted domains and subdomains can include portions or all of a domain part of a user's email address, where the domain part includes all characters in the email address following the "@" sign/character. An extracted regex can comprise a sequence of characters from the domain part of the user's email address, such as a substring from the domain part.

In accordance with embodiments, a user's retrieved organization or affiliation information from a user profile can be used to dynamically add an authenticated user to a group. Certain embodiments can retrieve a user's organization name from a third party provider, such as, for example, an email server, and then place the user in a group if a matching organization name is found in a hierarchical group repository. Additional or alternative embodiments automatically assign a user to one or more groups based on matching a domain, subdomain, or regex extracted from an authenticated user's email address with a group in a predefined mapping including mappings (i.e., bindings) of domains, subdomains, and regular expressions to groups. For example, an authenticated user with an email address having a domain part including 'adobe.com' can be automatically added to an Adobe® employee group, provided the adobe.com domain has been bound to the Adobe® employee group in a predefined domain-group mapping. In additional or alternative embodiments, if the domain part of the address includes a country code second level domain or regex indicative of a country or region, the user can be automatically mapped to an entity's group associated with that country or region. For example, if an authenticated user's email address includes the 'adobe.com.br' or 'adobe.co.uk' domains, that user can be mapped to Adobe® groups for employees in Brazil or the United Kingdom, respectively. Also, for example, if a user's email domain part includes the subdomain 'sales.adobe.com', that user can be added to Adobe® sales staff group. In embodiments, assignments based on a domain or subdomain extracted from an email address can be attempted if organization information was either not retrieved or not matched with an organization in the hierarchical group repository. According to these embodiments, a group assignment based on an email address is attempted as a fall back in response to determining that a group assignment based on retrieved organization information was not performed.

The group assignments performed by the exemplary systems and methods disclosed herein are dynamic in that they are based on organization information and/or an email domain of a user that is not known until a runtime user logon. The user logon can be an explicit logon whereby the user furnishes credentials including an email address via a user interface. Alternatively, the user logon can be implicit as part of a resource request initiated by the user. Such implicit logons include an email address and at least one other credential, but the credentials may not be explicitly entered by a user. For example, the credentials may be known and sent with a resource request based on the context of the request, such as a particular client computing device or application the request is submitted from. In these cases, the user may have previously furnished credentials (i.e., to access an entity's intranet from a particular web browser application executing on a particular client computing device).

Embodiments disclosed herein provide automated methods and systems for authenticating users and assigning authenticated users to groups associated with an entity. Permissions and privileges can be aggregated into roles or groups. Groups can have defined, configurable rights, permissions, and privileges associated with them. Authenticated users assigned or added to groups by the methods and systems disclosed herein are granted the rights, permissions, and privileges afforded to members of the respective groups. In certain embodiments, rights, permissions, and privileges can be aggregated into logical objects such as roles, which can be granted to users or associated with groups. Exemplary groups and roles can include, but are not limited to, system administrator, system support, creator, author, account administrator, user, developer, network administrator, database administrator, manager, guest, contractor, and other. Groups can be associated with an entity or a subset of an entity. According to embodiments, an entity can be, for example, one or more of a business, an association, an educational institution, a government, an organization, or a department, division, agency, or subset of an entity. Exemplary subsets of a business entity can include, for example, an information technology (IT) group, a sales group, a management group, and a secretarial group. Exemplary divisions of a business entity can include manufacturing, research and development (R&D), marketing, legal, and regional or geographic divisions associated with the entity's office locations, supplier locations, markets, or employee locations. In cases where an entity is an educational institution, exemplary groups or roles can include, but are not limited to, student, faculty, member, learner, instructor, mentor, staff, alumni, prospective student, admitted student, guest, researcher, administrator, observer, and other.

In certain embodiments, an administrator, using an administrator user interface (UI), can establish and configure a hierarchical repository of groups for an entity as well as mappings of domains, subdomains, and regular expressions to groups in a mapping table. Exemplary groups can include one or more administrator groups whose members are granted read, write, execute, and delete permissions (i.e., rights) for electronic resources and assets associated with the entity as well as privileges to create, modify and delete directories, file systems, users, and groups. The hierarchical repository can include author groups with respective subsets of administer resource permissions, such as, for example, read and write permissions with limited delete permissions. The hierarchical repository can also include contractor or non-employee groups with limited read and write permissions, as well as guest or anonymous groups with minimal permissions and privileges. Embodiments perform user authentication using third party authentication providers and use an application programming interface (API) to access the hierarchical content repository storing user and group data. In one embodiment, the hierarchical repository can be accessed via the Content Repository API for Java (JCR) specification.

As used herein, the terms "JCR repository" and "JCR" are used interchangeably to refer to a content repository that is compliant with the JCR specification. In embodiments, a JCR repository is compliant with a specification developed under the Java Community Process via a Java Specification Request (JSR). In certain embodiments, a JCR repository compliant with the JSR-170 specification can be used as a hierarchical repository for group and user data, including group and user metadata. An exemplary JCR repository can be implemented as an object database including a tree of nodes having associated properties. One example of a JCR repository is the Adobe® Content Repository Extreme (CRX) Enterprise Content Management (ECM) platform. The JCR repository can be implemented within a composite content applications platform configured to natively manage content in the JCR repository. The JCR repository can include a web application framework based on Representational State Transfer (REST) principles (i.e., a RESTful web application framework). Certain embodiments of the JCR repository allow connectivity for user authentication according to one or more of the Content Management Interoperability Services (CMIS) standard, the Web Distributed Authoring and Versioning (WebDAV) extension of the hypertext transfer protocol (HTTP), a Common Internet File System/Server Message Block (CIFS/SMB) application-layer network protocol, the Java Remote Method Invocation (RMI) API, WebDAV with JCR extensions (i.e., DavEx), and an LDAP application protocol. Another exemplary JCR repository is the Apache Jackrabbit content repository for Java platforms. According to embodiments, as users are created and authenticated, they can be added to the hierarchical repository and automatically mapped to at least one group in the repository based on a domain extracted from their email address.

In embodiments, a hierarchical repository of users and groups can be embodied as a globally accessible repository for managing access to electronic content (i.e., digital assets) and web-based applications for creating, managing, and delivering personalized online experiences to users. Certain embodiments of the user authentication and group assignment systems described herein can be implemented as part of Adobe® Experience Manager (formerly Adobe® CQ). Adobe® Experience Manager can work with third party authentication providers as part of a content management platform for providing web content management and electronic document security. Adobe® Experience Manager allows content access policy creation and group administration through the use of domain creation within an entity. Embodiments allow group management and administration via Adobe® Experience Manager using domains created external to an entity. Embodiments implemented within Adobe® Experience Manager are configured to work with third party authentication servers, including synchronized, multiserver authentication server environments. Adobe® Experience Manager document security features can implement the user authentication techniques described herein by leveraging existing directory services such as LDAP, Microsoft® Active Directory (AD), and Microsoft® AD Domain Services (AD DS) to authenticate user account credentials. Directory services can provide an organized set of records, such as a pre-defined hierarchical structure or arrangement of information about resources.

In yet another embodiment, an automated process implements user authentication and dynamic user-group assignments within a web application framework, such as, for example, Adobe® Experience Manager. In one embodiment, a RESTful web application framework can leverage a JCR repository as a content storage platform and provide an extensible, scriptable, web application content delivery platform. The RESTful web application framework can be accessed via a RESTful web API or web service. One non-limiting implementation can include a Adobe® Experience Manager web application content delivery platform running inside a runtime Open Services Gateway initiative (OSGi™) framework. As would be understood by those skilled in the relevant art(s), the OSGi™ framework from the OSGi™ Alliance include specifications for a modular, component system and service platform for the Java programming language. In an example implementation, Adobe® Experience Manager can use an Apache Sling framework to authenticate Hypertext Transfer Protocol (HTTP) requests, where a Sling authentication handler validates credentials against a third party provider or system in order to authenticate a user. As would be understood by those skilled in the relevant art(s), Apache Sling is an open source web framework for Java platforms. Apache Sling allows creation of content-centric applications that use JCR content repositories. Once the user is authenticated by the third party provider, an embodiment creates a new user in the JCR repository as necessary. The JCR repository can be a hierarchical repository for group and user data. Embodiments can authenticate a user by generating and exchanging an authentication request and response with an authentication provider. Exemplary authentication request-response exchanges can use an open standard for authorization (OAuth) protocol or an OAuth Authorization Framework. Additional or alternative embodiments can use a Security Assertion Markup Language (SAML) protocol for authentication request-response exchanges such that authentication requests are formatted as SAML requests and the corresponding responses are formatted as SAML responses. Embodiments can supplement Adobe® Experience Manager's ability to add users to groups by allowing dynamic assignments of users to groups at runtime (i.e., as users are created and authenticated), where the assignments are based on mappings of domains extracted from user email addresses to one or more groups.

According to embodiments, user authentication can be performed in part by leveraging discoverable services based upon providing an email address and a credential with an Autodiscover request to a Microsoft® Exchange server or request to a server running an IBM Notes or Lotus Notes application from IBM.

One embodiment provides a system that automates adding authenticated users to groups. The users can be added to groups based on a defined mapping including mappings (i.e., bindings) of a domain name, subdomain, and/or a regular expression (regex) found in the user's email address to one or more groups. In certain embodiments, the system automatically adds an authenticated user to at least one group associated with an entity based in part on determining that a domain name, subdomain, and/or regex extracted from the user's email address is associated with the entity and correlating the extracted domain name, subdomain, and/or regex to at least one group in the defined mapping that is associated with the entity. The defined mapping can be stored, for example, in a database or repository accessible by the system. The repository can be in memory or on disk. The system can retrieve, modify and delete records from the defined mapping using database queries and commands. The system can include a display device and bindings in the mapping can be configured by an administrator via a user interface (UI) rendered on the display device. In embodiments, the UI can be used to create new domain-to-group bindings, delete existing domain-group bindings, and modify existing domain-group bindings. For example, the UI can also be used to create new subdomain-to-group bindings, delete existing subdomain-group bindings, and modify existing subdomain-group bindings. In additional or alternative embodiments, the UI can be used to create, modify and delete regex-to-group bindings. In one embodiment, the bindings can be one-to-one such that a given domain name (e.g., "adobe.com"), subdomain (e.g., "support.adobe.com"), or regex (e.g., "adobe") is mapped to a single group. Alternatively, the bindings can be one-to-many such that a given domain, subdomain, or regex is mapped to multiple groups. Exemplary bindings can be based on a domain name, or subsets thereof, such as, for example, subdomains and regular expressions extracted from the domain part. For example, the system can be configured to receive an email address associated with an authenticated user, parse the email address to identify the domain part of the email address, and then extract a domain name from the domain part. In additional or alternative embodiments, the system can be further configured to extract one or more subdomains or regular expressions (i.e., substrings) included in the domain part. The system can then lookup bindings for the domain name, subdomains, and/or regular expressions, in the mapping.

In cases where an authenticated user's domain part includes a domain name, a subdomain, and/or regex that is associated with multiple groups in the mapping, embodiments can place an authenticated user in one group according to a sequence or hierarchy of rules. In one example embodiment, an authenticated user can be added to a group based on the first match found in the following sequence: 1) the user's organization retrieved from the user's IP Multimedia subsystem (IMS) profile or GAL record and an organization in a group repository; 2) the user's email domain and a domain-group binding in the mapping; 3) a subdomain found in the user's email domain and a subdomain-group binding in the mapping; 4) a regex from the user's email domain and a regex-group binding in the mapping; and 5) a default group (if configured for new users, the user is a new user, and none of rules 1-4 apply). In an embodiment, rule 1 can be implemented with a user's organization retrieved from an authenticated user's record in a GAL of an email server. If rules 1 and 2 do not apply or are not satisfied, rule 3 can be applied based on one or more subdomains extracted from the user's email domain. If rules 1-3 do not apply or are not satisfied, rule 4 can be applied based on one or more regular expressions extracted from the user's email domain. In embodiments where an authenticated user is only added to a single group, the authenticated user can be assigned to the first group matching rules 1-5, with the rules being applied sequentially in the order shown above.

One embodiment provides an administrator UI that a system administrator can use to manage dynamic mapping of users to groups. In certain embodiments, references to groups are provided via the administrator UI instead of actual group data. As used herein, the term "metadata" is used to refer to information associated with (and generally but not necessarily stored with) electronic content items such as group records and user entries in a repository that provides information about a property of the electronic content item. Metadata may include information uniquely identifying an electronic content item. Such metadata may describe a storage location or other unique identification of the electronic content item. For example, metadata for a database table mapping domain names to groups may describe storage locations of the table and individual domain-group mapping records. Metadata for a group entry in a repository can include rules for assigning users to the group. For example, metadata can indicate hierarchical rules for automatically adding users to groups based on user email domains or subdomains. Such metadata can be a reference to a storage location of the domain-group mapping table in a server system used to assign authenticated users to groups. One example of such a reference is a Uniform Resource Locator (URL) identifying the storage location on a web server associated with a web site. An exemplary administrator UI 200 is described below with reference to FIG. 2.

An embodiment provides a system for user authentication and group assignment that includes a repository, such as a data store or database, for storing a hierarchical group repository, such as a JCR. The group repository can store group data, group metadata, user data, and user metadata. An example group repository 122 is described below with reference to FIG. 1. The system also includes another data store with a mapping containing bindings of domains, subdomains, and regular expressions, to groups. An example mapping 110 is described below with reference to FIG. 1. The metadata can include characteristics and properties of users and groups. The user properties can include, but are not limited to, group membership(s), role(s), title, demographic data, organization affiliation(s), entity affiliation(s), geographic location, department, office location (i.e., within a campus or building), contact information such as alternative email address(es), phone number(s), facsimile number(s), and other user properties. The user properties can include data available in a GAL record for an authenticated user. Group properties can include, but are not limited to: role(s); resource permissions and rights such as read, write, rename, delete, and execute; system privileges such as privileges to create, delete, or modify file systems, directories, users, roles, and groups; and other group properties. User or group metadata may describe relationships between users and groups, such as when a particular user was added to a group, groups that a user is currently a member of, and/or groups a user was formerly a member of. In additional or alternative embodiments, group and user properties and metadata can be stored separately from the repository such as in a GAL record for an authenticated user.

Unless specifically stated differently, a "user" is interchangeably used herein to identify a user account, a human user, or a software agent. Besides a human user who requests resources, a software application or agent sometimes needs to access and update resources such as web pages or other electronic content. The systems and methods disclosed herein can authenticate user accounts associated with both human users and software agents. Similarly, the systems and methods disclosed herein are capable of assigning user accounts associated with human users or software agents to groups. Accordingly, unless specifically stated, the term "user" as used herein does not necessarily pertain to a human being.

Resources can be stored in network data servers, file servers, database servers, cloud storage, application servers, and web servers. Application servers can include enterprise email servers, servers hosting database management systems, and cloud-based servers hosting applications provided via a cloud service.

As used herein, the term "group" refers to any set of users or software agents. Users assigned or added to a group are referred to herein as members of a group. As users are assigned (i.e., added) to a group, they are granted one or more computing system resource rights, privileges and/or permissions associated with the group. If a user is removed from a group, rights, privileges and/or permissions associated with the group are revoked from the user. In certain embodiments, a user can be assigned to multiple groups. For example, a server system can assign a user to multiple groups. In cases where a user is a member of multiple groups, the user can be granted a superset of rights, privileges and/or permissions associated with the multiple groups. In alternative embodiments, a system can apply a sequence of hierarchical rules to assign a user to only a single group.

As used herein, the term "role" refers to any aggregation of resource rights, privileges and/or permissions that can be bestowed to users or software agents. In embodiments, one or more roles can be associated with a group. In additional or alternative embodiments, one or more roles can be granted directly to a user such that the user is granted the rights, privileges and/or permissions associated with the one or more roles.

As used herein, the term "electronic content" refers to any type of resource or media that can be rendered for display on computing devices. Electronic content can include text or multimedia files, such as images, video, audio, or any combination thereof. Electronic content can also include application software that is designed to perform one or more specific tasks at a computing system or computing device. Computing devices include client and server devices such as, but not limited to, servers, desktop computers, laptop computers, smart phones, video game consoles, smart televisions, tablet computers, portable gaming devices, personal digital assistants (PDAs), etc. Electronic content can be streamed to, downloaded by, and/or uploaded from computing devices. Electronic content can include multimedia hosted on websites, such as Internet web sites, intranet web sites, standard web pages, or mobile web pages specifically formatted for display on mobile computing devices. Electronic content can also include application software developed for computing devices that is designed to perform one or more specific tasks at the computing device.

Electronic content can be in the form of electronic content streamed from a server system to a client computing device. Streaming electronic content can include, for example, audio-visual content provided using a streaming protocol, such as, but not limited to, real time messaging protocol (RTMP), HTTP dynamic streaming (HDS), Internet Protocol television (IPTV), and HTTP Live Streaming (HLS).

As used herein, the term "user-group assignment" is used to refer to an association between a user account and a group wherein the user is a member of the group. User-group assignments for authenticated users can be automatically determined based upon matching a domain, subdomain, and/or regex from a user's email address to a group in a predefined domain-group mapping. Automatic user-group assignments can also be made based on dynamically determining a user's organization affiliation(s) via information received from an authentication provider. In embodiments, multiple user-group assignments are possible such that a single authenticated user can be assigned to multiple groups. In embodiments, such multiple groups can be associated with one or more entities, or divisions, departments or subsets of the entities.

As used herein, the terms "asset" and "digital asset" are used interchangeably to refer to an item of electronic content included in a multimedia object, such as text, images, videos, or audio files. As used herein, the term "image asset" is used to refer to a digital image included in a multimedia object. One example of an image asset is an image included in a web page requested by a user. As used herein, the term "video asset" is used to refer to a video file included in a multimedia object. As used herein, the term "text asset" is used to refer to text included in a multimedia object. Exemplary resources can be embodied as a text asset, an image asset, a video asset, or a combination of text, image, and/or video assets. For example, resources requested from client devices, can include a text asset, an email message, an image asset.

In embodiments, a group assignment system for automatically assigning a user to a group can be implemented as one or more modules configured to execute on a server or other computing device. The group assignment system can add an authenticated user to one or more groups based on mappings of domains to groups (i.e., bindings of domains or organizations to groups in a mapping table or 'whitelist') and hierarchical rules. The group assignment system can determine group assignments based on a domain extracted from an email address. For example, an authenticated user having an adobe.com email domain can be added to a corporate Adobe® group upon determining that a mapping table includes a record binding the domain adobe.com to such a group. The group assignment system can store domain-group bindings in a database and store group and user data in a hierarchical repository.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications and modules hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application or module can access data packets addressed to the port. Resource requests with credentials, authentication requests, responses to authentication requests, and requested resources can be sent via network connections and communications channels.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Exemplary System Implementation

Referring now to the drawings, FIG. 1 is a block diagram depicting an example architecture and system implementing certain embodiments. In particular, FIG. 1 is a block diagram illustrating components of a user authentication and group assignment system 100. The example system 100 includes a server 104 configured to perform server-side processing in response to inputs, resource requests, credentials 102, and authentication responses 132 received from an authentication provider 114 via a network 106.

As shown in FIG. 1, the user authentication and group assignment system 100 includes client devices 134, which can each include a processor 126 communicatively coupled to a memory 128. User authentication and group assignment system 100 includes server 104, client devices 134a-n, and a network 106. Client devices 134a-n are coupled to server 104 via a network 106. Processors 126a-n are each configured to execute computer-executable program instructions and/or accesses information stored in respective ones of memories 128a-n. Server 104 includes a processor 123 communicatively coupled to a memory 124. Processor 123 is configured to execute computer-executable program instructions and/or accesses information stored in memory 124. Processors 123 and 126a-n shown in FIG. 1 may comprise a microprocessor, an application-specific integrated circuit (ASIC), a state machine, or other processor. For example, processor 123 can include any number of computer processing devices, including one. Processor 123 can include or may be in communication with a computer-readable medium. The computer-readable medium stores instructions that, if executed by the processor, cause one or more of processors 123 and 126a-n to perform the operations, functions, and steps described herein. When executed by processor 123 of server 104, the instructions can also cause processor 123 to implement the modules shown in FIG. 1. When executed by one or more of processors 126a-n of client devices 134a-n, the instructions can also cause processor to render the user interface shown in FIG. 2 on respective ones of display devices 121a-n.

A computer-readable medium may comprise, but is not limited to, an electronic, optical, magnetic, or other storage device capable of providing a processor with computer-readable instructions. Other examples comprise, but are not limited to, a floppy disk, a CD-ROM, a DVD, a magnetic disk, a memory chip, ROM, RAM, an ASIC, a configured processor, optical storage, magnetic tape or other magnetic storage, or any other medium from which a processor such as processor 123 or processors 126a-n can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

Client devices 134a-n may also comprise a number of external or internal devices, including input devices such as a mouse, keyboard, stylus, touch sensitive interface. Client devices 134a-n can also comprise an optical drive such as a CD-ROM or DVD drive, a display device, audio speakers, one or more microphones, or any other input or output devices. For example, FIG. 1 depicts the client device 134a having a processor 126a, a memory 128a, and a display device 121a. A display device 121 can include (but is not limited to) a screen integrated with a client device 134, such as a liquid crystal display (LCD) screen, a touch screen, or an external display device 121, such as a monitor.

FIG. 1 also illustrates client devices 134a-n including respective display devices 121a-n. Client devices 134 can render user interfaces (UIs) capable of submitting requests for resources, credentials 102, and displaying requested resources. Client devices 134a-n can include one or more software modules or applications to configure their respective processors 126a-n to retrieve, via a network 106, one or more resources, as permitted by user-group assignments 125a-n determined by server 104. Such modules and applications can configure the processor 126 to render the requested resource for display on display device 121.

Although FIG. 1 depicts email domain parser 116, authentication module 118 and group assignment module 120 as separate modules, one or more of these modules can be included as a software module of a single application. Similarly, while an exemplary mapping 110 and a group repository 122 are shown in FIG. 1 as being hosted locally on server 104, in alternative embodiments, one or both of mapping 110 and group repository 122 can be hosted on an external server (not shown) remote from server 104. For example, group repository 122 can be hosted on a dedicated database server accessible from server 104 via network 106. User authentication and group assignment system 100 stores domain-to-group bindings in mapping 110. System 100 stores group and user information, including group and user metadata, in group repository 122. Descriptions of exemplary functionality of email domain parser 116, authentication module 118 and group assignment module 120 are provided in the following paragraphs.

In an embodiment, an authentication module 118 is invoked when a user of a client device 134 requests access to a particular resource, electronic content item, or asset. The request can be made, for example, in the user interface of an email application or Internet browser executing at client device 134a, via a touch screen display device 121b, or other user input received via an input device 108b at client device 134b or via input devices 108n at a client device 134n. The resource request is then sent with credentials 102 from the client device 134 to server 104 via network 106. In one embodiment, when the request for a resource and credentials 102 are received at server 104, authentication module 118 performs user authentication as described below to determine if the user is authorized to access the requested resource, electronic content item, or asset.

An exemplary authentication module 118 can be configured to generate an authentication request 130 including credentials 102 received by server 104 as part of a resource request. In an embodiment, authentication module 118 is invoked after a user at a client device 134 requests a resource, such as a web page or other electronic content. According to one embodiment, authentication module 118 is responsible for generating and sending authentication requests 130 to an authentication provider 114. In one embodiment, authentication module 118 can invoke email domain parser 116 to identify the domain part of an email address received with credentials 102. The domain part can be used to determine a particular authentication provider 114 to route an authentication request 130 to.

As seen in FIG. 1, authentication provider 114 can be a third party authentication provider 114 remote from server 104. In the exemplary implementation of FIG. 1, authentication provider 114 can use authentication protocols and frameworks, such as, but not limited to, OAuth and SAML. In additional or alternative embodiments, authentication provider 114 can host a discoverable service, such as, for example, an Autodiscover service. In each of these embodiments, a user can be authenticated based upon an email address and one other credential (i.e., a password) included in credentials 102. The authentication provider 114 can be configured to send an authentication response 132 to server 104, where the response 132 includes a full user name in cases where the user is authenticated. In cases where the user is not authenticated, response 132 will indicate an authentication status. After response 132 is received by server 104, it can be forwarded to authentication module 118. If the response 132 indicates that a user has been authenticated (i.e., as evidenced by the presence of a full user name in the response), an email domain parser 116 can be invoked to parse the domain part of the email address received with credentials 102. In additional or alternative embodiments, a response 132 for an authenticated user can additionally include organization or entity information for the user. For example, a third party authentication provider 114 can include information from an authenticated user's GAL record indicating one or more of an entity (i.e., employer), department, division, business unit, practice group, location (i.e., geographic office location), and other organization information associated with the user.

In the exemplary embodiment shown in FIG. 1, email domain parser 116 consists of a sub-module or component, a domain extractor 129. Exemplary functionality of the parser and its extractor component is described below.

The email domain parser 116 can parse an email address received as part of credentials 102 to identify the domain part of the email address (i.e., all characters in the email address following the "@" sign/character). Email domain parser 116 can then invoke domain extractor 129 in order to extract a domain name from the email address. In certain embodiments, email domain parser 116 can work in conjunction with domain extractor 129 to further extract subdomains and/or regular expressions from the domain part. For example, a domain part can be extracted from an email address by domain extractor 129 using the following logic, which can be customized by an administrator: a domain name can be extracted based on the entire domain part of the email address as (e.g., adobe.com can be extracted from an email address of jdoe@adobe.com); one or more subdomains can be extracted based on delimited portions of the domain part (e.g., sales.adobe.com and adobe.corp.com can be extracted from an email address of jdoe@ sales.adobe.corp.com), and/or one or more regular expressions can be extracted based on substrings of the domain part (e.g., support, adobe, and corp can be extracted from an email address of jdoe@support.adobe.corp.com).

In an embodiment, client devices 134 comprise one or more resource navigation devices, such as, but not limited to, an input device 108b configured to interact with browser-based UI of a tablet client device 134b having a touch screen display device 121b, and input devices 108n of a smartphone client device 134n. In an embodiment, a client device, such as client device 134b, may be integrated with a display device 121b, so that the two form a single, integrated component. Client devices 134a-n can include any suitable computing devices for communicating via network 106, requesting a resource, furnishing credentials 102, and rendering a requested resource for display and/or modification (as permitted according to an authentication response 132 and a user-group assignment 125 established for an authenticated, requesting user).

As shown in FIG. 1, each of the client devices 134a-n is coupled to server 104 through network 106. Although not depicted in FIG. 1, in an alternative embodiment, server 104 can be located separately from group repository 122. Client devices 134 receive operational commands from users, including commands to request resources, assets, or electronic content items, commands to provide credentials 102 needed to access the requested content, and commands to navigate to, view, and modify (if authorized), the requested resource.

In the exemplary embodiment shown in FIG. 1, group assignment module 120 consists of a sub-module or component, an organization/entity matcher 131. Exemplary functionality of group assignment module 120 and its matcher component is described below.

As shown in FIG. 1, group assignment module 120 is configured to interact with group repository 122 and mapping 110 to determine one or more user-group assignments 125 for an authenticated user. In the embodiment of FIG. 1, group assignment module 120 is invoked in response to determining that a user (existing or new) has been successfully authenticated by authentication module 118. At this point, group assignment module 120 invokes email domain parser 116 to perform the above-described parsing and extracting functionality. After domain extractor 129 has extracted the domain and any subdomains or regular expressions from the domain part, group assignment module 120 checks to see if the extracted domain, subdomain(s) (if any), and regular expression(s) (if any) are in mapping 110. If so, the user is assigned to the corresponding group as indicated in mapping 110 and a user-group assignment 125 is created. Otherwise, the user is either assigned to a default group or not assigned to a group (i.e., no user-group assignment 125 is created), depending on customizable settings for group assignment module 120. In an embodiment, the customizable settings can be established and modified by an administrator using an administrator UI, such as the exemplary administrator UI described below with reference to FIG. 2. Group repository 122 contains information for each group in the user authentication and group assignment system 100. As seen in FIG. 1, an exemplary group repository 122 can be implemented as a hierarchical group repository, such as a JCR. Mapping 110 can be implemented as any data store, repository, or database table having a record for each binding of a domain, subdomain, or regex to a group. Data for each group represented in a binding within mapping 110 can be stored in group repository 122. In additional or alternative embodiments, group membership information, including identities of existing users in user-group assignments 125, can also be stored in group repository 122.

In additional or alternative embodiments, group assignment module 120 can invoke organization/entity matcher 131 to determine if an organization or entity indicated in an authentication response 132 is present in mapping 110. For example, if a user's entity and/or organization information, such as an employer, department, business unit, practice group, or office location is returned by authentication provider 114 as part of an authentication response 132, organization/entity matcher 131 can perform a lookup in mapping 110 for that entity and/or organization information. If a binding of the user's entity or organization to a group is found in mapping 110, group assignment module 120 can create a user-group assignment 125 pursuant to that binding.

It is to be appreciated that the server 104 can establish user-group assignments 125 for any new, authenticated user submitting credentials 102 as part of a resource request. Resource requests may include credentials 102, such as a unique identifier and a password. As shown in FIG. 1, the unique identifier can be an email address. Credentials 102 may be explicitly entered, via input made using input devices 108, or submitted implicitly based on a user associated with a particular client device 134. Resource requests as described herein refer to a request for any electronic content that is, generally, available for delivery to an individual client device 134, with delivery initiated upon successful authentication of credentials 102 received with an explicit request from that client device 134. In response to a resource request from a client device 134, server 104 may make a user-group assignment 125 to a group stored in group repository 122. The user-group assignment can be based on a correlation between at least a portion of an email address included in credentials 102 and a group in domain-group binding in mapping 110. In embodiments, the correlation can be performed by group assignment module 120.

According to an embodiment, user authentication and group assignment system 100 displays an administrator UI (shown in FIG. 2) on display device 121. In embodiments, display device 121 may be one or more of a monitor, a display of a tablet device (see, e.g., display device 121b), the display of a laptop, the display of a mobile phone (see, e.g., display device 121n), or the display of a personal computer (see, e.g., display device 121a).

Server 104 can receive credentials 102, send authentication requests 130, receive responses 132, and provide requested resources via the network 106. User-group assignments 125a-n include a user account matched to at least one group from the group repository 122. User-group assignments 125a-n may be resident in any suitable computer-readable medium, group repository 122, and/or memory 124 of server 104. In another embodiment, the user-group assignments 125a-n can be accessed by the server 104 from a remote location via network 106.

Server 104 can include any suitable computing system for hosting the mapping 110, email domain parser 116, authentication module 118, group assignment module 120, and group repository 122. As shown in FIG. 1, server 104 includes a processor 123 coupled to a memory 124. In one embodiment, server 104 may be a single computing system. In another embodiment, server 104 may be a virtual server implemented using multiple computing systems or servers connected in a grid or cloud computing topology. As described below with reference to FIG. 5, processor 123 may be a single processor in a multi-core/multiprocessor system. Such system can be configured to operate alone with a single server 104, or in a cluster of computing devices operating in a cluster or server farm.

Network 106 may be a data communications network such as the Internet. In embodiments, network 106 can be one or a combination of networks such as an entity's intranet, the Internet, a Wide Area Network (WAN), WiFi, a Local Area Network (LAN), or any other wired or wireless network. Server 104 may provide requested resources via network 106. Depending on access rights in an assigned group, authenticated users may only be granted access to resources or electronic content via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet.

Client devices 134a-n can establish respective network connections with server 104 via network 106. One or more of an email application, an Internet browser, or another client application used to request a resource can be executed at a client device 134 to establish a network connection via network 106. The network connection can be used to communicate packetized data representing requested resources between server 104 and client device 134.

For example, as permitted by an authentication response 132 and a user-group assignment 125, server 104 can provide a requested resource as electronic content via network 106. An email application or Internet browser can access the electronic content by retrieving the requested resource from server 104 via network 106. Server 104 can provide the requested content as packetized data. An email application or Internet browser can configure a processor 126 of the client device 134 to render a retrieved resource for display on display device 121.

Exemplary User Interface

Figure 2:
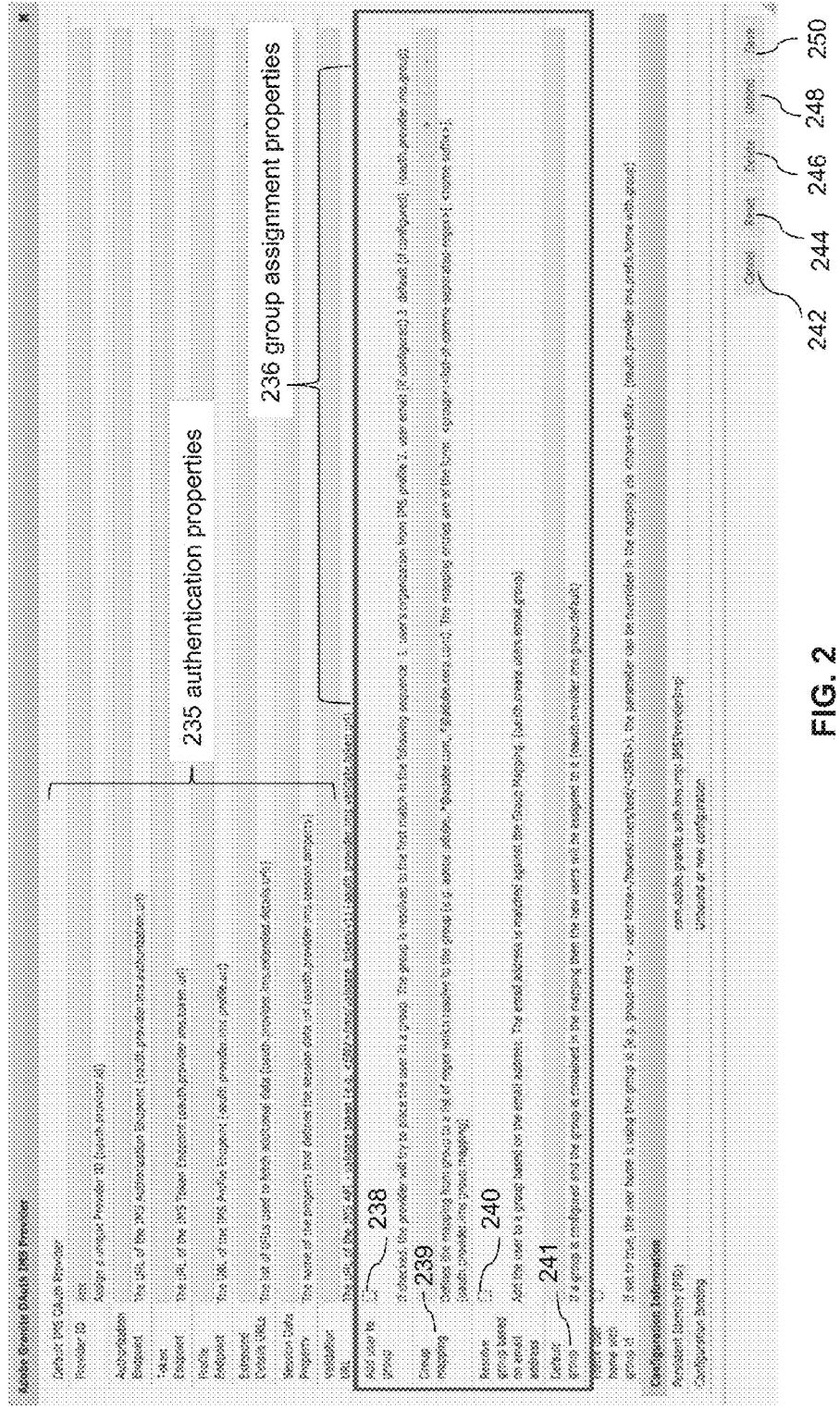
FIG. 2 illustrates an example user interface for a group assignment application, in accordance with embodiments.

FIG. 2 illustrates an exemplary administrator user interface (UI), according to embodiments of the present disclosure. The UI depicted in FIG. 2 is described with reference to the embodiment of FIG. 1. However, the UI is not limited to that example embodiment. In embodiments, the UI can be displayed on client devices 134a-n on respective ones of display devices 121a-n.

In FIG. 2, a display is shown with various data entry fields, checkboxes, and buttons that are used to initiate action, invoke routines, establish and modify group mappings (i.e., bindings of domains, subdomains, and regular expressions to groups), define default group assignments for new users, or invoke other functionality. The initiated actions include, but are not limited to, establishing an authentication provider 114, displaying and modifying URLs for user validation/authentication, displaying and modifying URLs for fetching additional user data (i.e., user entity and organization data), and configuring group assignment properties. In embodiments, some or all of the URLs for user authentication and/or fetching user data can be predetermined based upon the authentication provider 114 being used. In additional or alternative embodiments, URLs for user authentication and/or fetching user data can be formulated by inserting a domain part of an authenticated user's email address into URLs including predefined portions.

In embodiments, the display devices 121*a-n* used to display the user interface shown in FIG. 2 may be displayed via the display interface 502 and the computer display 530 described below with reference to FIG. 5. In certain embodiments, the UI can be configured to be displayed on a touch screen display device 121. According to embodiments, a user can interact with the UI shown in FIG. 2 using input devices 108 shown in FIG. 1. In additional or alternative embodiments, input devices can also be embodied as other devices, such as, but not limited to, a stylus, a finger, a mouse, a keyboard, a keypad, a joy stick, a voice activated control system, or other input devices used to provide interaction between an administrator or other user and the UI. As described below with reference to FIG. 2, such interaction can be used to indicate group assignment properties 236, establish domain-group bindings in mapping 110, establish subdomain-group bindings in mapping 110, and establish regex-group bindings in mapping 110.

FIG. 2 illustrates an exemplary administrator UI 200. In one embodiment, certain users provided with certain administrator privileges in user authentication and group assignment system 100 are granted access to administrator UI 200. For example, after providing login credentials 102 and being authenticated by authentication module 118, an administrator can launch the administrator UI 200. As seen in FIG. 2, administrator UI 200 includes authentication properties 235. The exemplary authentication properties 235 shown in FIG. 2 include a provider ID for an authentication provider 114. Other authentication properties 235 are displayed in administrator UI 200 based on the authentication provider 114. In certain embodiments, at least some of the other authentication properties 235 are customizable by an administrator in administrator UI 200. As shown in FIG. 2, exemplary authentication properties 235 can also include a URL for an authorization endpoint, a URL for a token endpoint, a URL for a profile endpoint, URLs for fetching additional user data (i.e., user entity and organization data), a session data property (i.e., a name or property that defines a session data URL), and a validation URL (i.e., a URL of an API used to validate a token or otherwise authenticate a user).

With continued reference to FIG. 2, administrator UI 200 also includes group assignment properties 236, which include an 'add user to group' checkbox 238, a group mapping 239 data entry field, a 'resolve group based on email address' checkbox 240, and a default group 241 data entry field. By selecting, using an input device 108, add user to group checkbox 238, an administrator can indicate that user authentication and group assignment system 100 is to attempt to place an authenticated user in a group pursuant to group assignment properties 236. In the example embodiment illustrated in FIG. 2, if the add user to group checkbox 238 is selected, a user-to-group assignment can be resolved by the first match found in the following sequence: 1) a user's organization retrieved from the user's IMS profile; 2) a user email domain (if configured by selecting resolve group based on email address checkbox 240); and 3) a default group (if configured by entering a default group into the default group 241 data entry field for new users and no match is found by applying rules 1 and 2). In one embodiment, rule 1 can be applied by attempting to match an organization retrieved from an authenticated user's IMS profile to a group in group repository 122. In certain embodiments, if a match is not found by applying rule 1, rule 2 can be applied based on a domain, one or more subdomains, and/or one or more regular expressions extracted from an authenticated user's email domain. In embodiments where an authenticated user is only added to a single group, the user is assigned to the first group matching rules 1-3, with the rules being applied sequentially in the order shown in FIG. 2.

As shown in FIG. 2, group assignment properties 236 include a group mapping 239 data entry field so that an administrator can define one or more domain-group mappings (i.e., bindings), subdomain-group bindings, and/or regex-group bindings in mapping 110. The group mapping 239 data entry field depicted in FIG. 2 can be used to enter a list of domains, subdomains and regular expressions to be bound to an administrator-entered group. In the non-limiting example provided in FIG. 2, group mapping 239 can be used to define multiple bindings in mapping 110 by entering a comma-separated list of regular expressions, domains, and/or subdomains to be resolved to (i.e., bound to) a given group in the form: <group>:<list of comma-separated domains, subdomains, and/or regular expressions>. As seen in FIG. 2, group mapping 239 can be used to define a binding of a regex (e.g., "adobe") to a group, a binding of a domain name (e.g., "adobe.com") to a group, and/or a binding of a subdomain (e.g., "adobe.corp.com") to a group. As seen in FIG. 2, by entering values into group mapping 239, bindings can be created as a many-to-one relationship with multiple, comma-separated regular expressions, domains, or subdomains being mapped to a given group in mapping 110. By selecting, using an input device 108, resolve group based on email address checkbox 240, an administrator can indicate that an authenticated user is to be assigned to a group based on the user's email address. For example, if resolve group based on email address checkbox 240 is selected, group assignment module 120 will attempt to match a domain from an email address included in credentials 102 to a domain-group binding in mapping 110. Group assignment properties 236 also include a data entry field to indicate a default group an authenticated user is to be added to. In one embodiment, a binding for the default group is created in mapping 110 and an authenticated user not matching any other group assignment properties 236 is assigned to the default group.

Administrator UI 200 also includes context-specific buttons 242, 244, 246, 248 and 250. For example, administrator UI 200 includes a cancel button 242 that is selectable, using an input device, to undo modifications to authentication properties 235, and/or cancel saving of newly-entered or edited group assignment properties 236, including bindings entered, but not yet saved, via the group mapping 239 data entry field. A reset button 244 can be selected, using an input device 108, to reset certain authentication properties 235 and/or group assignment properties 236 back to default values. Administrator UI 200 also includes a delete button 246, which, depending on the context at the time it is selected, can be selected to delete authentication properties 235 and/or group assignment properties 236. For example, if delete button 246 is selected while the active focus of administrator UI 200 is on an existing binding in the group mapping 239 data entry field, the binding can be deleted so as to sever or remove a mapping between a group and a domain, subdomain or regex. Administrator UI 200 further includes an unbind button 248 to unbind a previously bound configuration of authentication properties 235 and group assignment properties 236. As seen in FIG. 2, administrator UI 200 also includes a save button 250 to save changes to authentication properties 235 and/or group assignment properties 236.

Exemplary Methods

Figure 3:
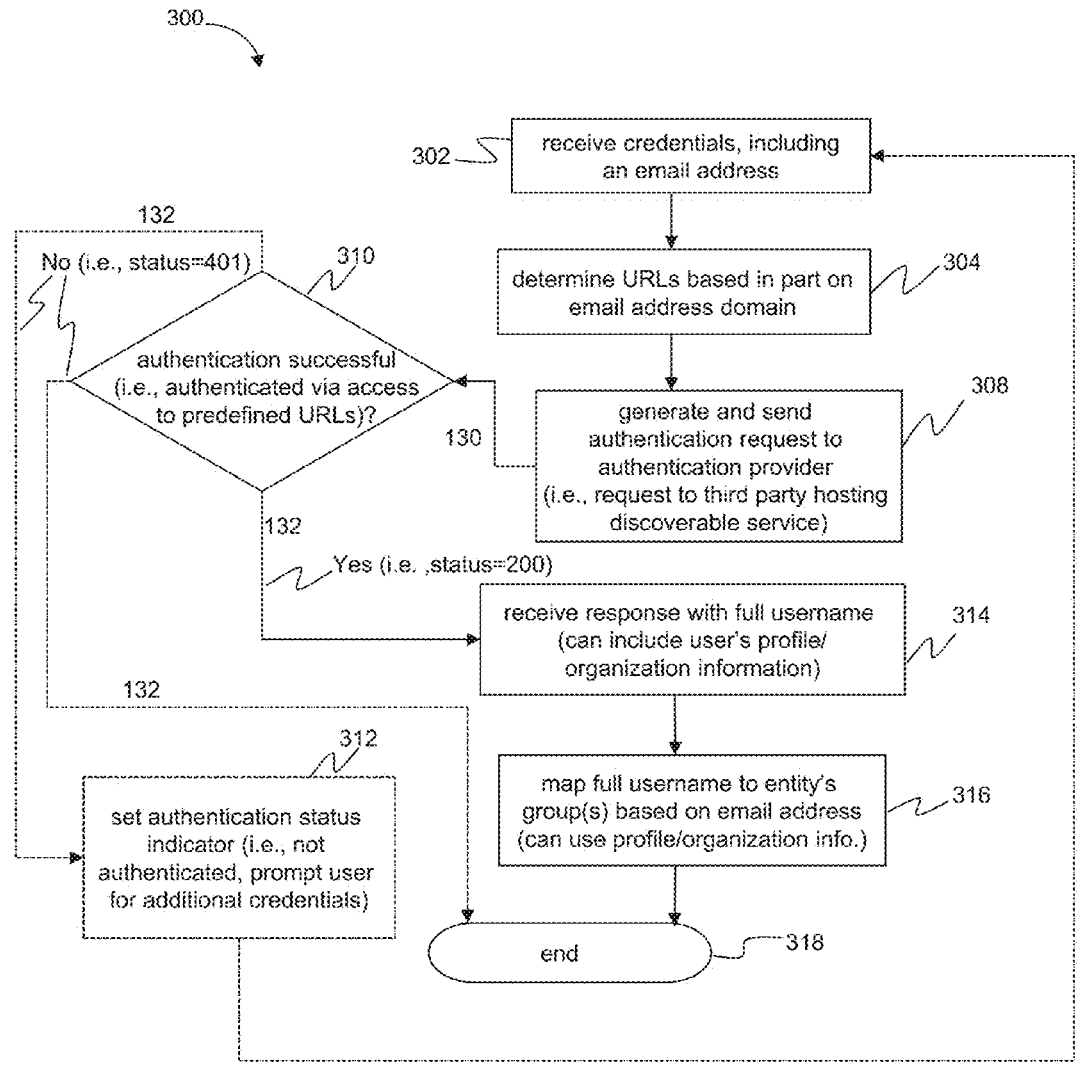
FIG. 3 is a flow chart illustrating an example method for authenticating a user, in accordance with embodiments.

FIG. 3 is a flow chart illustrating an example method 300 for authenticating a user and mapping an authenticated user to a group. For illustrative purposes, the method 300 is described with reference to the system and UI implementations described above with reference to FIGS. 1 and 2. Other implementations, however, are possible. Optional and/or additional steps and portions of steps are indicated in the flowchart by parenthetical phrases and dashed lines (see, e.g., steps 308, 310, 312, 314, and 316).

The method 300 begins in step 302 where credentials, including an email address, are received. This step can comprise receiving credentials 102 from a client device 134, via network 106, at server 104 as described above with reference to FIG. 1. After the credentials are received, control is passed to step 304.

In step 304, one or more URLs for authentication are determined based upon the domain portion of the email address received in step 302. In embodiments, at least portions of the URLs are predefined based on an authentication provider 114 being used. Step 304 can be performed by authentication module 118 invoking email domain parser 116 to extract the domain part of the received email address, and then determining URLs that method 300 will attempt to access. An embodiment of step 304 can include determining one or more predefined URLs established as an authentication property 235 in administrator UI 200. In an embodiment, the URLs can include portions of the domain part of the email address. According to certain embodiments described below with reference to steps 304-314, the URLs determined in step 304 can be a set of Autodiscover endpoint URLs.

In step 308, an authentication request is generated and sent to an authentication provider. As show in FIG. 3, the authentication provider 114 can be a third party provider hosting a discoverable service and the authentication request can be sent as an authentication request 130 as described above with reference to FIG. 1. In embodiments described in the following paragraphs, if the discoverable service is an Autodiscover service, the authentication request 130 can be formatted as an Autodiscover request to access the URLs determined in step 304.

As would be understood by those skilled in the relevant art(s), an Autodiscover service can be hosted on a back end server, such as, but not limited to, a Microsoft® Exchange server or a server configured to run an IBM Notes or Lotus Notes application from IBM. If the discoverable service is an Autodiscover service, embodiments of method 300 repurpose or leverage the Autodiscover service to find a mailbox and other associated mailbox information for an authenticated user. Discoverable services such as an Autodiscover service can provide configuration information to authentication module 118, whether authentication module 118 is separated from authentication provider 114 by a firewall. The Autodiscover service can be configured as a web service that provides back end server configuration information to server 104. Embodiments of server 104 can be configured to generate Autodiscover requests and process corresponding Autodiscover responses to determine an endpoint of an Autodiscover service for a specific mailbox based on an email address received with credentials 102 in step 302. An Autodiscover service can provide at least three different access techniques or frameworks. Embodiments of method 300 and authentication module 118 can use one or all of the techniques described below. The methods used by authentication module 118 may depend on an environment that server 104 runs in and a particular email server that authentication module 118 is sending an authentication request 130 to. Three alternative, potentially complementary, techniques for accessing Autodiscover are described below. Any or all of these techniques or any other appropriate technique can be used to perform exemplary embodiments of steps 308-314.

The authentication request 130 can be formatted as an Active Directory Service Connection Point (SCP) lookup. SCP lookup can be performed as part of steps 304 and 308 in embodiments where authentication module 118 and/or server 104 has access to an entity's Microsoft® Active Directory (AD) directory service or the entity's AD Domain Service (AD DS). According to these non-limiting embodiments, an SCP lookup is performed as part of steps 308 and 310 to identify a set of Autodiscover endpoint URLs. The set of Autodiscover endpoint URLs may be configured by an administrator of the back end server (i.e., an email server). If the back end server is a Microsoft® Exchange server running certain versions of Exchange, the authentication request 130 can be formatted as a Simple Object Access Protocol (SOAP) Autodiscover request. In this exemplary embodiment, user authentication is based in part on attempting to access a URL returned by a SOAP Autodiscover process. Alternatively, or additionally, if the back end server is a Microsoft® Exchange server running other, certain versions of Exchange and the discoverable service hosted by authentication provider 114 is an Autodiscover XML service (PDX), authentication request 130 can be formatted as an Extensible Markup Language (XML) Autodiscover request. In certain embodiments where the discoverable service is an Autodiscover service, steps 304-310 can be performed as follows: 1.) in environments that have access to an AD service or an AD DS service, such as environments within an entity's intranet, an AD SCP lookup can be performed in step 304 to identify a set of Autodiscover endpoint URLs. Otherwise, if 1.) is not applicable, such as in environments without access to an AD service or an AD DS service, then: 2.) a set of Autodiscover endpoint URLs can be generated in step 304 using predefined rules. Next, as part of step 308, 3.) an Autodiscover request can be sent to URLs in the set of Autodiscover endpoint URLs from 1.) or 2.), whichever is applicable, until it is determined in step 310 that an Autodiscover request has succeeded (i.e., has resulted in a status of "200"). Then, if 3.) results in a successful Autodiscover request, the user is determined to be successfully authenticated and step 310 can include 4.) where user information is requested from the successfully determined Autodiscover endpoint. In one embodiment, such user information is additional information beyond a full user name and credentials 102 included in authentication request 130. For example, the user information can include the authenticated user's profile or group information returned from the successfully determined Autodiscover endpoint. This additional user information can be included in authentication response 132 returned by step 310.

For each of the above-described Autodiscover techniques, the discoverable service is an Autodiscover service, authentication request 130 is formatted as an Autodiscover request, and authentication provider 114 is an enterprise email server. In certain embodiments, authentication provider 114 can be an enterprise email server configured as to support an ActiveSync protocol. For example, an ActiveSync protocol can be used by mobile client devices, such as client devices 134*b* and 134n, to access a Microsoft® Exchange mailbox as part of an ActiveSync Autodiscover authentication in cases where another Autodiscover service, such as a Microsoft® Exchange Autodiscover service, is not enabled or available. In these example embodiments using Autodiscover requests, user authentication is based at least in part on determining, by authentication provider 114, the URL of an ActiveSync endpoint using the email address and at least a portion of the other credentials 102 received in step 302. After an authentication request 130 is generated and sent to an authentication provider in step 308, control is passed to step 310.

In step 310, a determination is made as to whether the user authentication was successful. The determination in this step can be performed by an authentication provider 114 and indicated in an authentication response 132. In some embodiments, method 300 infers that a user is authenticated if an attempt to access the URLs determined in step 304 is successful. For example, step 310 can determine that a user is authenticated based on a Hypertext Transfer Protocol Secure (HTTPS) request for one of the URLs resulting in a status of "200" (i.e., successful access to the URL). If the authentication request 130 generated and sent in step 308 was a SOAP Autodiscover request, step 310 comprises determining an authentication status based at least in part on a SOAP Autodiscover response. If it determined that authentication was successful, control is passed to step 314. Otherwise, if it is determined that authentication was unsuccessful, control is optionally passed to step 312 to prompt the user for additional credentials, or to step 318, where method 300 ends.

In optional step 312, an authentication status is set according to the authentication response 132. As shown in FIG. 3, a response 132 including a status of "401" for attempted access to the predefined URLs indicates that authentication was unsuccessful. In step 312, a user can be prompted to reenter credentials 102, or to provide additional credentials. If reentered and/or additional credentials are received, control is passed back to step 302.

In step 314, an authentication response 132 for a successfully authenticated user is received. Such an authentication response 132 will include at least the user's full name (i.e., a display name). This step can optionally comprise receiving additional user information, such as, for example, information from a GAL record corresponding to the authenticated user. The additional information received in this step can include an authenticated user's group membership(s), role(s), organization information, office location, phone number(s), and/or department. After the authentication response 132 is received, control is passed to step 316.

Next, in step 316, the full username received in step 314 is mapped to at least one group associated with an entity. Step 316 can comprise invoking group assignment module and its organization/entity matcher 131 to correlate the full username to a group based on implicit group associations. In additional or alternative embodiments, step 316 can comprise mapping the full username to an entity's group based on a predefined mapping, such as mapping 110. After the full username is mapped to at least one group associated with an entity, control is passed to step 318, where method 300 ends.

Figure 4:
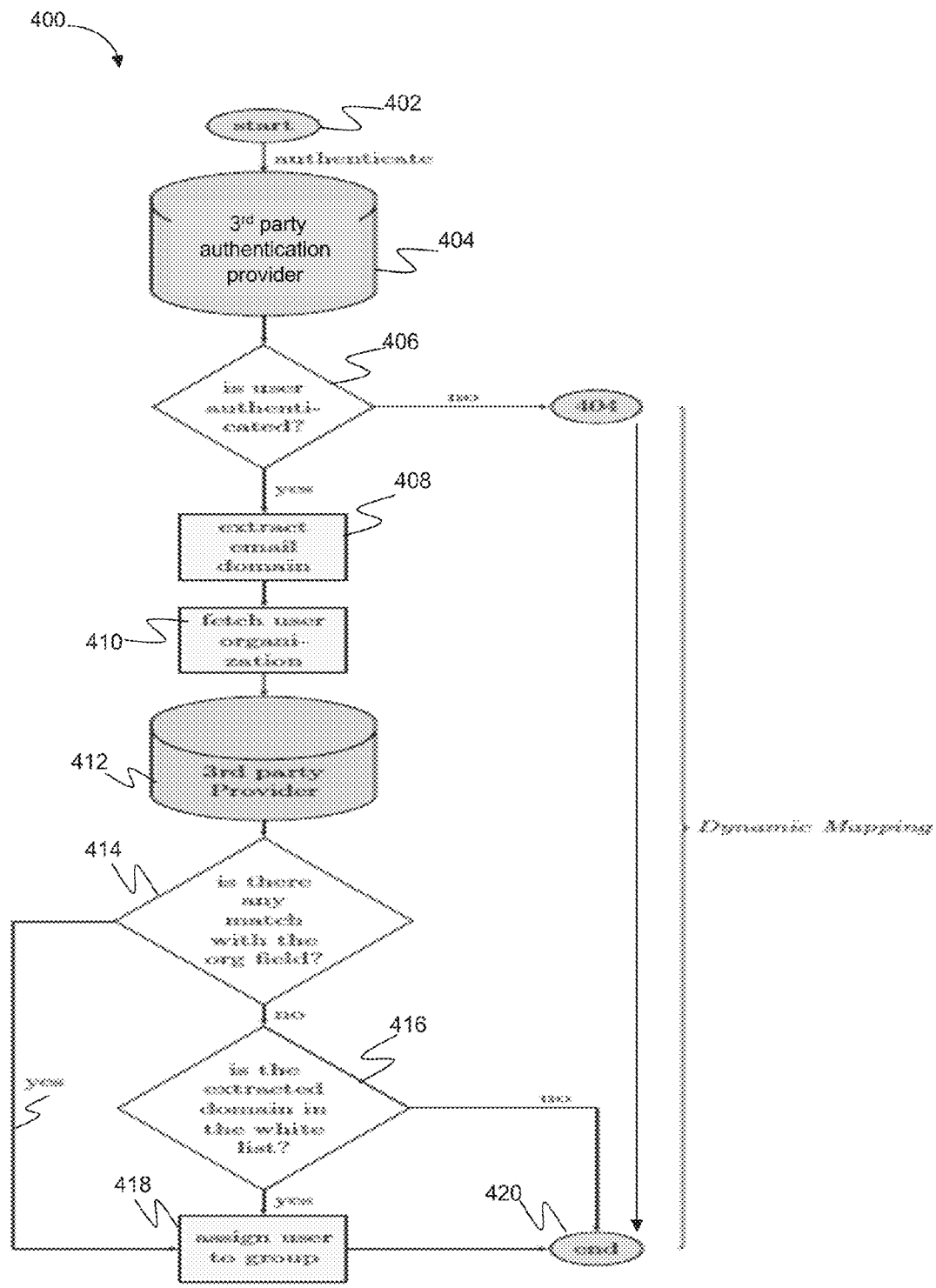
FIG. 4 is a flow chart illustrating an example method for dynamically mapping an authenticated user to a group, in accordance with embodiments.

FIG. 4 is a flow chart illustrating an example method 400 for dynamically mapping an authenticated user to a group. For illustrative purposes, the method is described with reference to the system, UI, and method implementations depicted in FIGS. 1-3. Other implementations, however, are possible.

The method 400 begins at step 402 where a request for a resource and credentials of a user requesting the resource are received. This step can comprise receipt of account credentials 102 including an email address as described above with reference to FIGS. 1 and 3.

Next, in step 404, the credentials received in step 402 are authenticated. In the example of FIG. 4, the authentication is performed by a third party authentication provider. In an embodiment, step 404 can be performed by authentication provider 114. In certain embodiments, step 404 can comprise sending an authentication request 130 to an authentication provider 114, as described above with reference to FIG. 1.

In step 406, a determination is made as to whether the user is authenticated. If it is determined that the user has not been authenticated, an authentication error status is set (e.g., a "404" status for an attempted access to a predefined URL). The authentication status can be set in an authentication response 132. After the authentication status is set for an unsuccessful authentication, control is passed to step 420, where method 400 ends. Otherwise, if it is determined that the user is authenticated, control is passed to step 408.

As shown in FIG. 4, steps 408-418 are performed to dynamically map an authenticated user to a group.

In step 408, the email domain is extracted. In an embodiment, this step can be performed by email domain parser 116 in conjunction with domain extractor 129. In embodiments, this step can comprise extracting one or more subdomains from the email domain part. After the domain part has been extracted from the email address, control is passed to step 410. In certain embodiments, steps 410 and 412 are optional and no organization is retrieved or used to assign a user to a group. In accordance with these embodiments, the method proceeds directly from step 408 to step 416.

In step 410, an organization corresponding to the authenticated user is retrieved. In one embodiment, step 410 can comprise retrieving an organization name based on matching the domain extracted in step 408 with a correlation of domains to organizations or entities in a repository, such as, for example a JCR. In alternative or additional embodiments, step 410 can comprise fetching organization information from an authenticated user's GAL record. Such fetching can be performed, for example, as part of authentication performed by an authentication provider 114 and returned as part of an authentication response 132. After the organization for the authenticated user is retrieved, control is passed to step 412.

Next, in step 412, a third party provider attempts to match the retrieved organization name to an existing group. Step 412 can comprise attempting to match a user with an entity's group using a regular expression (regex) query to group repository 122. Such a query can be implemented as a query to a JCR via an API. Alternatively, this step can comprise attempting to correlate an organization name retrieved in step 410 with a regex-group binding in mapping 110, where the regex is the retrieved organization name.

In step 414, a determination is made as to whether there was any match between an organization and a group in step 412. If it determined that there was no match, control is passed to step 416. If it determined that there was a match between the organization name and a group, control is passed to step 418.

In step 416, a determination is made as to whether the extracted domain (or subdomain) from step 408 is in a predefined mapping (i.e., a 'whitelist'). In one embodiment, this step comprises querying mapping 110 for the domain and any extracted subdomains. If it determined that the extracted domain (or a subdomain) is in the mapping, control is passed to step 418. Otherwise, if it determined that the domain (and/ or any extracted subdomains) are not in the mapping, control is passed to step 420 where method 400 ends.

In step 418, the authenticated user is assigned to at least one group matched from step 414 or 416. In one embodiment, step 418 results in creation of a user-group assignment 125, and the requested resource is delivered, via network 106, to an email application or Internet browser executing on a client device 134. After the user is assigned to the at least one group, control is passed to step 420, where method 400 ends.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Exemplary Computer System Implementation

Figure 5:
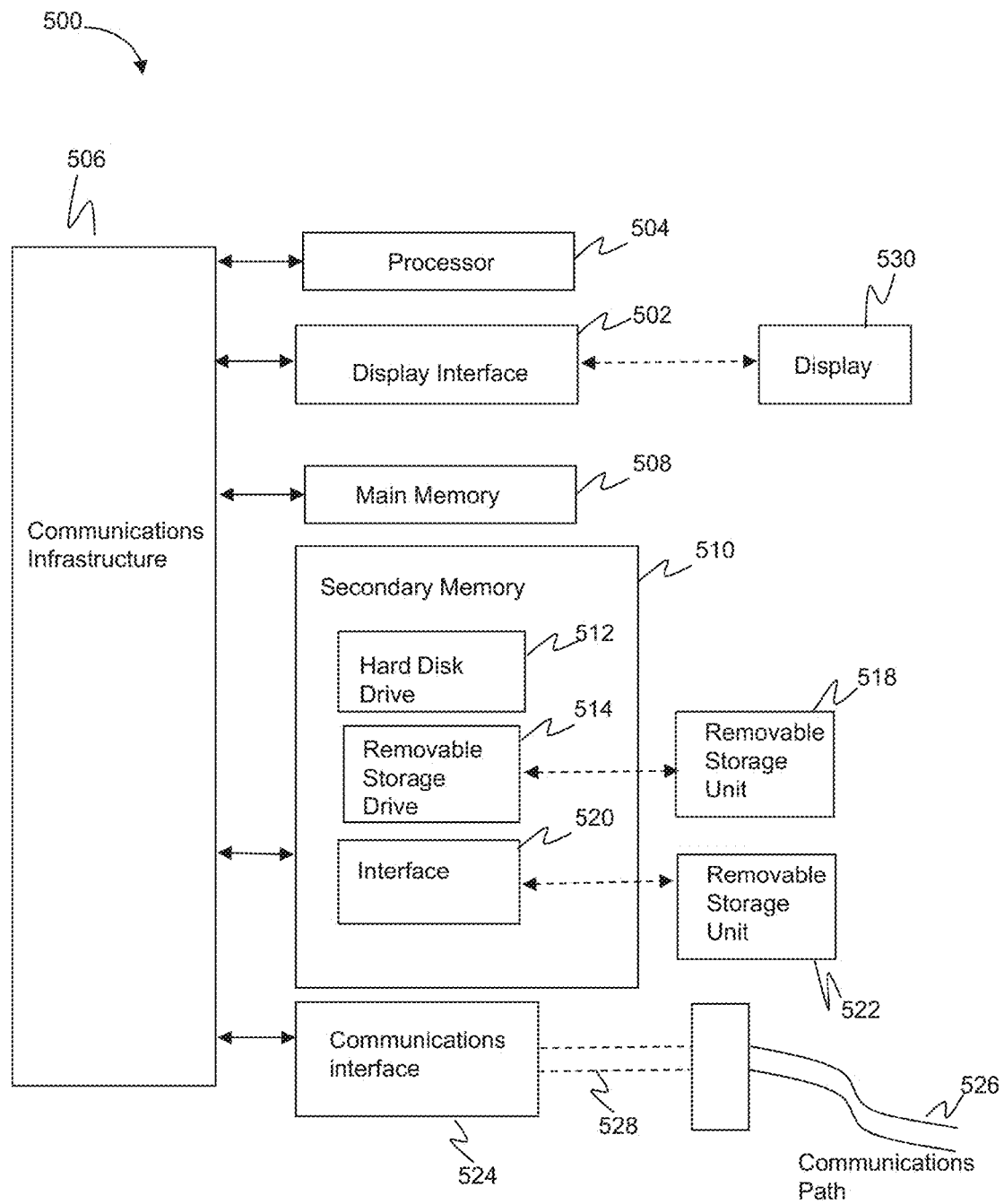
FIG. 5 is a diagram of an exemplary computer system in which embodiments of the present disclosure can be implemented.

Although exemplary embodiments have been described in terms of user authentication and group assignment systems and methods, it is contemplated that certain functionality described herein may be implemented in software on microprocessors, such as a processors 126*a-n* and 128 included in the client devices 134*a-n* and server 104, respectively, shown in FIG. 1, and computing devices such as the computer system 500 illustrated in FIG. 5. In various embodiments, one or more of the functions of the various components may be implemented in software that controls a computing device, such as computer system 500, which is described below with reference to FIG. 5.

Aspects of the present invention shown in FIGS. 1-4, or any part(s) or function(s) thereof, may be implemented using hardware, software modules, firmware, tangible computer readable media having logic or instructions stored thereon, or a combination thereof and may be implemented in one or more computer systems or other processing systems.

FIG. 5 illustrates an example computer system 500 in which embodiments of the present invention, or portions thereof, may be implemented as computer-readable instructions or code. For example, some functionality performed by client devices 134*a-n* and server 104 shown in FIG. 1, can be implemented in the computer system 500 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 300 and 400 illustrated by the flowcharts of FIGS. 3 and 4 discussed above and the administrator UI 200 discussed above with reference to FIG. 2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme. In certain embodiments, one or more of the processors 123 and 126*a-n* described above with reference to user authentication and group assignment system 100, server 104, and client devices 134*a-n* of FIG. 1 can be embodied as the processor device 504 shown in FIG. 5.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a magnetic tape drive, an optical disk drive, a flash memory, or the like. In non-limiting embodiments, one or more of the memories 124 and 128*a-n* described above with reference to server 104 and client devices 134*a-n* of FIG. 1 can be embodied as the main memory 508 shown in FIG. 5.

The removable storage drive 514 reads from and/or writes to a removable storage unit 518 in a well-known manner. Removable storage unit 518 may comprise a magnetic tape, optical disk, etc. which is read by and written to by removable storage drive 514. As will be appreciated by persons skilled in the relevant art, removable storage unit 518 includes a non-transitory computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or EEPROM) and associated socket, and other removable storage units 522 and interfaces 520 which allow software and data to be transferred from the removable storage unit 522 to computer system 500. In non-limiting embodiments, one or more of the memories 124 and 128*a-n* described above with reference to server 104 and client devices 134*a-n* of FIG. 1 can be embodied as the main memory 508 shown in FIG. 5.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data 528 transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 508 and secondary memory 510, which can be memory semiconductors (e.g., DRAMs, etc.). Computer readable medium and non-transitory computer readable medium can also refer to removable storage unit 518, removable storage unit 522, and a hard disk installed in hard disk drive 512. Signals carried over communications path 526 can also embody the logic described herein. These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the steps in the methods 300 and 400 illustrated by the flowcharts of FIGS. 3 and 4, discussed above. Accordingly, such computer programs represent controllers of the computer system 500. Where an embodiment of the invention is implemented using software, the software may be stored in a computer program product and loaded into computer system 500 using removable storage drive 514, interface 520, and hard disk drive 512, or communications interface 524.

In an embodiment, the display devices 121a-n used to display interfaces of an email application, Internet browser, and/or another client application used to request and display resources may be a computer display 530 shown in FIG. 5. The computer display 530 of computer system 500 can be implemented as a touch sensitive display (i.e., a touch screen). Similarly, the administrator UI 200 shown in FIG. 2 may be embodied as a display interface 502 shown in FIG. 5.

Embodiments of the invention also may be directed to computer program products comprising software stored on any computer readable medium. Such software, when executed in one or more data processing device, causes a data processing device(s) to operate as described herein. Embodiments employ any computer readable medium. Examples of computer useable mediums include, but are not limited to, primary storage devices (e.g., any type of random access memory), secondary storage devices (e.g., hard drives, floppy disks, CD ROMS, DVDs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method comprising:
    receiving, at a computing device, a resource request including account credentials and an email address associated with a user requesting a resource associated with an entity, wherein the account credentials include an entity identifier;

authenticating the user by:
generating an authentication request based on the account credentials and the email address by extracting a domain name from the email address and including the extracted domain name, the email address, and the account credentials in the authentication request;
forwarding the authentication request to an authentication provider remote from the computing device; and
receiving, at the computing device, a response to the authentication request, the response including an indication of an authentication status for the user and an indication that the user is associated with the entity; and
determining, based at least in part on the presence of a full user name in the response, that the user is authenticated.

2. The method of claim 1, wherein the account credentials further include one or more of a screen name, a user identifier (ID), a user principal name (UPN), a password, biometric data, a security token, a personal identification number (PIN), a unique identifier, a network domain name, and a role name.

3. The method of claim 1, wherein the generating further comprises:
parsing the email address to identify a domain part of the email address; and
extracting the domain name from the domain part of the email address,
wherein the authentication provider is a third party authentication provider unaffiliated with the entity.

4. The method of claim 1, wherein:
the authentication request is formatted as a request to a discoverable service;
the authentication provider is an email server hosting the discoverable service; and
the response is based on an ability to access, via a Hypertext Transfer Protocol Secure (HTTPS) protocol, one of a set of URLs; and
the response further includes one or more of:
user information corresponding to a mailbox of an authenticated user; and
data from a record in a global address list (GAL) of the email server, the record corresponding to the authenticated user.

5. The method of claim 1, wherein:
the authentication request is formatted as an Autodiscover request;
the authentication provider is a server hosting an Autodiscover service;
the authenticating comprises:
determining whether the computing device can access an Active Directory (AD) service or an AD Domain Service (AD DS);
in response to determining that the computing device can access an AD service or an AD DS service, performing an AD Service Connection Point (SCP) lookup to identify a set of Autodiscover endpoint uniform resource locators (URLs);
in response to determining that the computing device cannot access an AD service or an AD DS service, generating a set of Autodiscover endpoint URLs using predefined rules;
sending the Autodiscover request to an Autodiscover endpoint URL in the set of Autodiscover endpoint URLs;
in response to determining that the Autodiscover request was successful:
setting the indication of the authentication status in the response to indicate that the user is authenticated; and
requesting user information from the Autodiscover endpoint URL;
in response to determining that the Autodiscover request was unsuccessful, repeating the sending for another Autodiscover endpoint URL in the set of Autodiscover endpoint URLs; and
the response includes the user information from the Autodiscover endpoint URL for the authenticated user.

6. The method of claim 5, wherein:
the Autodiscover request is an Extensible Markup Language (XML) Autodiscover request; and
the Autodiscover service is an Autodiscover XML service (PDX).

7. The method of claim 5, wherein:
the Autodiscover request is a Simple Object Access Protocol (SOAP) Autodiscover request; and
the Autodiscover service is a SOAP Autodiscover service.

8. The method of claim 1, further comprising:
in response to determining that the indication included in the response indicates that the user is not authenticated, prompting the user for additional account credentials; and
in response to receiving the additional account credentials at the computing device, repeating the authenticating.

9. The method of claim 1, wherein the resource request is one of:
a request from an existing user;
an explicit request to create a new user account; or
an implicit request to create a new user account as part of a resource request received from a new user.

10. The method of claim 1, wherein the response further includes one or more of group membership information, organization information, entity information for the entity associated with the resource, user role information, title, department, geographic location information, office location information, and contact information associated with an authenticated user.

11. The method of claim 10, wherein the contact information includes one or more of a phone number, a facsimile number, a postal address, and another email address associated with the authenticated user.

12. The method of claim 1, wherein the resource request is a Hypertext Transfer Protocol (HTTP) GET request, and wherein the response indicates the entity associated with the resource.

13. The method of claim 1, wherein the authentication request and the response are compliant with an open standard for authorization (OAuth) protocol or an OAuth Authorization Framework.

14. The method of claim 1, wherein the authentication request and the response are compliant with a Simple Object Access Protocol (SOAP), and wherein the authenticating comprises a SOAP message exchange between the computing device and the authentication provider.

15. The method of claim 1, wherein:
the authenticating is performed using a Security Assertion Markup Language (SAML) protocol;
the authentication request is formatted as a SAML request; and
the response is formatted as a SAML response.

16. A system comprising:
a processor; and
a memory having instructions stored thereon, that, if executed by the processor, cause the processor to perform operations comprising:
receiving a resource request including account credentials and an email address associated with a user requesting a resource associated with an entity, wherein the account credentials include an entity identifier;
authenticating the user by:
generating an authentication request based on the account credentials and the email address by extracting a domain name from the email address and including the extracted domain name, the email address, and the account credentials in the authentication request;
forwarding the authentication request to an authentication provider remote from the system; and
receiving a response to the authentication request, the response including an indication of an authentication status for the user and an indication as to whether the user is associated with the entity; and
determining, based at least in part on the presence of a full user name in the response, that the user is authenticated.

17. The system of claim 16, wherein the generating further comprises:
parsing the email address to identify a domain part of the email address; and
extracting the domain name from the domain part of the email address,
wherein the authentication provider is a third party authentication provider unaffiliated with the entity.

18. The system of claim 16, wherein:
the authentication request is formatted as a request to a discoverable service;
the authentication provider is an email server hosting the discoverable service; and
the response is based on an ability to access, via a Hypertext Transfer Protocol Secure (HTTPS) protocol, one of a set of URLs; and
the response further includes one or more of:
user information corresponding to a mailbox of an authenticated user; and
data from a record in a global address list (GAL) of the email server, the record corresponding to the authenticated user.

19. A non-transitory computer readable storage medium having executable instructions stored thereon, that, if executed by a computing device, cause the computing device to perform operations, the instructions comprising:
instructions for receiving a resource request including account credentials and an email address associated with a user requesting a resource associated with an entity, wherein the account credentials include an entity identifier;
instructions for authenticating the user by:
generating an authentication request based on the account credentials and the email address by extracting a domain name from the email address and including the extracted domain name, the email address, and the account credentials in the authentication request;
forwarding the authentication request to an authentication provider remote from the computing device; and
receiving a response to the authentication request, the response including an indication of an authentication status for the user and an indication as to whether the user is associated with the entity; and
instructions for determining, based at least in part on the presence of a full user name in the response, that the user is authenticated.

20. The non-transitory computer readable storage medium of claim 19, wherein:
the authentication request is formatted as an Autodiscover request;
the authentication provider is a server hosting an Autodiscover service;
the instructions for authenticating comprise:
instructions for determining whether the computing device can access an Active Directory (AD) service or an AD Domain Service (AD DS);
in response to determining that the computing device can access an AD service or an AD DS service, instructions for performing an AD Service Connection Point (SCP) lookup to identify a set of Autodiscover endpoint uniform resource locators (URLs);
in response to determining that the computing device cannot access an AD service or an AD DS service, instructions for generating a set of Autodiscover endpoint URLs using predefined rules;
instructions for sending the Autodiscover request to an Autodiscover endpoint URL in the set of Autodiscover endpoint URLs;
in response to determining that the Autodiscover request was successful:
instructions for setting the indication of the authentication status in the response to indicate that the user is authenticated; and
instructions for requesting user information from the Autodiscover endpoint URL;
in response to determining that the Autodiscover request was unsuccessful, instructions for repeating the sending for another Autodiscover endpoint URL in the set of Autodiscover endpoint URLs; and
the response includes the user information from the Autodiscover endpoint URL for the authenticated user.

* * * * *